Dec. 8, 1970  S. KLEIN ET AL  3,545,981

METHOD OF MAKING CANDY

Filed June 1, 1967  2 Sheets-Sheet 1

INVENTORS
STEPHEN KLEIN
GEORGE KLEIN
BY
Kenyon & Kenyon
ATTORNEYS

INVENTORS
STEPHEN KLEIN
GEORGE KLEIN
BY
Kenyon & Kenyon
ATTORNEYS

United States Patent Office 3,545,981
Patented Dec. 8, 1970

1

3,545,981
METHOD OF MAKING CANDY
Stephen Klein and George Klein, New York, N.Y., assignors to Barton's Candy Corporation, Brooklyn, N.Y., a corporation of New York
Filed June 1, 1967, Ser. No. 642,863
Int. Cl. A23g 1/00
U.S. Cl. 99—138                                    4 Claims

ABSTRACT OF THE DISCLOSURE

Molded chocolates having a base of one type of chocolate, e.g., dark chocolate, and a raised top decoration of another type or color of chocolate, e.g., milk chocolate, which are integral and have a smooth outer surface at the juncture of the decoration and the base are described. The chocolates are formed in a mold having a bottom and sides and having in the botom a depression corresponding to the raised design. Molten chocolate for the raised design is deposited in the depression in an amount not greater than the volume of the depression and, after at least a film has formed on the surface of the molten chocolate, chocolate for the base is deposited in an amount sufficient to fill the mold. The chocolate is then allowed to solidify. If desired, a shell is formed by allowing solidification of the second-deposited chocolate only at the surface of the mold cavity, and decanting the still molten chocolate prior to complete solidification. The chocolate may be replaced by coating materials other than chocolate, such as the known cocoa butter or vegetable fat based materials generally referred to by the term "compound."

Description of the invention

Having briefly summarized the disclosure, the present invention is concerned with molded candies and a method for their production. In a preferred embodiment, this invention is related to molded chocolates having a base of one type of chocolate and a raised design of another type or color of chocolate and to a method for producing them. In a still more preferred embodiment, this invention concerns filled chocolate candies, the shell of which is composed of different types or colors of chocolates.

In the past molded chocolates have been formed by pouring molten chocolate into a mold cavity and allowing solidification to occur at least at the surface of the cavity by cooling the mold. If filled chocolates are desired, solidification is allowed to occur at the mold surface and then, while still cooling, the mold is inverted to decant still molten chocolate from the center of the cavity leaving a molded solid shell. The mold is again inverted, the filling, such as fruit-flavored creams, nuts and the like, is placed in the shell, the mold is then cooled to solidify the filling, the exposed surface is heated, as by radiant heating, and additional chocolate for the bottom is added. After complete solidification, the molded chocolate is removed from the mold. In a similar manner filled candies have been produced wherein the shell is formed of "compound," a composition having as the base fat either cocoa butter or a vegetable fat substitute, and including milk solids, flavorings and colors as other constituents.

In many cases it is desired to provide the candy with a raised design on the top surface of the molded piece of a different type or color of chocolate or compound from that forming the base. In the past this was effected by manually placing a piece of chocolate or compound conforming to the desired design, commonly termed a "button," on the top of the molded base, or by hand decorating. In addition to the expense of the labor required to perform this operation, this technique was generally undesirable because of the difficulty of achieving proper placement of the button on the base and the problem of melting either the bottom of the button or the top of the base sufficiently to secure the button to the base without distorting either piece. As a result the product frequently was not uniform, and had a crude appearance.

It is an object of this invention to provide a molded candy having an integral base and raised design of different types or colors of candy, especially chocolate.

It is a further object of this invention to provide a method for molding such candies in an economical manner.

These and other objects will be apparent from the appended specification, drawings and claims.

In accordance with this invention there is employed a mold having a cavity having a bottom and sides conforming to the desired shape of the base of the candy and in the bottom of the cavity a depressed portion having a bottom and sides corresponding to the raised design. Compound or chocolate of one type or color is deposited in the depressed portion and allowed to at least partially solidify, and then compound or chocolate of a second type or color is added and allowed to solidify. The completed piece is then removed from the mold.

This pocess, as applied to molded chocolate candies, is discussed in detail below with reference to the drawings of which:

Figure 1:
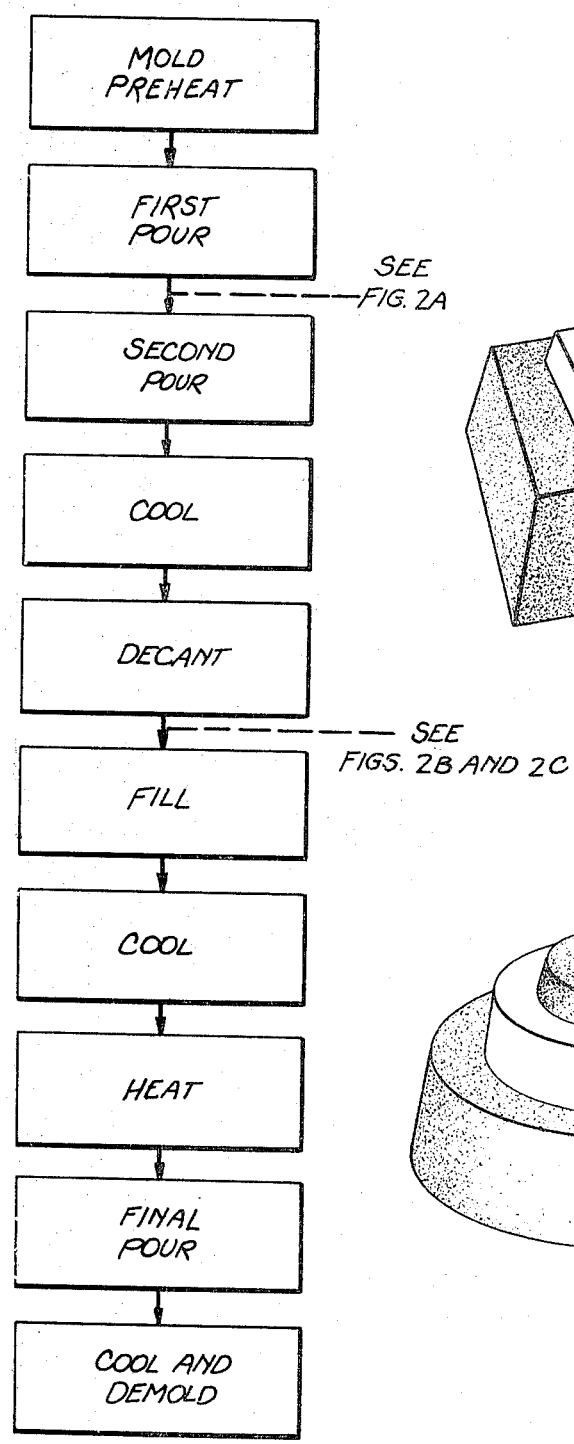
FIG. 1 is a schematic outline of the process employed in accordance with this invention.

With reference to FIG. 1, a mold, generally a mold plate containing a plurality of cavities, each of which has a depressed portion in the bottom thereof for forming the top decoration, is preheated, normally to a temperature below the melting point of the chocolate employed. As is generally known, molten chocolate can be cooled below its melting point, i.e., supercooled, without solidification and, in general, molding of chocolates occurs in the range of from the melting point of the chocolate down to about 10 or 15° F. below the melting point. For example, milk chocolate, which has a melting point of about 88 to 90° F., is normally poured at a temperature of about 80 to 85° F., into a mold which has been preheated to a temperature within the same range.

In accordance with this invention, the mold is desirably preheated to about 82 to 83° F. and then molten chocolate, for example milk chocolate, for the raised decoration is deposited in the depressed portion. The optimum temperature of the molten chocolate is generally known to the art, and will vary with the type. For example, milk chocolate will normally be poured at a temperature of 83 to 84° F., and dark chocolate will be poured at a temperature of 86 to 87° F.

It is essential that the amount of chocolate which is deposited at this stage not exceed the volume of the depressed portion, for if the molten chocolate overflows the depression, it will tend to flow along the surface of the mold or "bleed" when the chocolate for the base is added. It is preferred that the amount of chocolate deposited be less than the volume of the depression, provided that the amount is sufficient to completely cover the surface thereof. In geenral, when the volume of the depressed portion is in the range of from about 0.2 to about 1.5 cubic centimeters, the amount of chocolate deposited is preferably at least half its volume, i.e., from about 0.1 to about 0.75 cubic centimeter, and desirably about two-thirds of its volume.

When the ratio of chocolate volume to mold depression volume is in this range, the chocolate will normally coat the entire surface of the depression because of the wetting tendency of the molten chocolate. If desired, the coating of the surface can be aided by shaking the mold, as by the use of a conventional shaking table. In addition, this step assures complete penetration of the molten chocolate into the recesses of the mold depression.

Figure 2A:
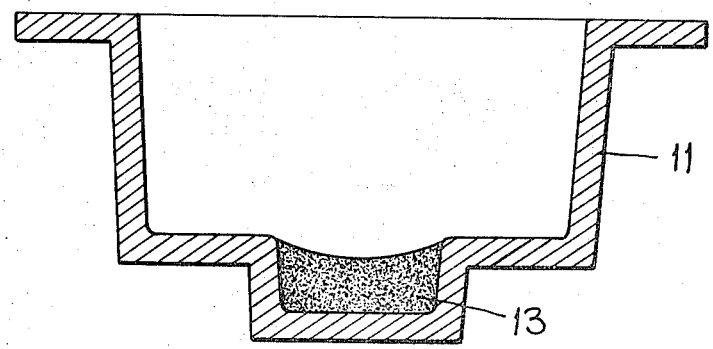
FIGS. 2A–2C illustrate various stages during the process of FIG. 1.

At this stage, as shown in FIG. 2A, mold 11 contains a slightly concave shell of molten chocolate 13 in the depressed portion.

After pouring and, if desired, shaking, the molten chocolate is allowed to at least partially solidify by cooling at the exposed surface of the molten chocolate without substantial cooling of the mold. This can be effected by exposing the chocolate to air at room temperature or below as desired. If desired, the air can be directed against the surface of the chocolate, as by the use of nozzles, although this is not required. The duration of this step is not narrowly critical, although it should be sufficient to allow at least a film of solidified chocolate to form on the upper surface of the molten button and thereby prevent intermingling of the chocolates in the subsequent step. When exposed to air at room temperature, a period of from about 15 seconds to about one minute, and preferably about a half a minute, is sufficient, although longer times can be employed if desired, in which case the entire button may solidify.

Figure 2B:
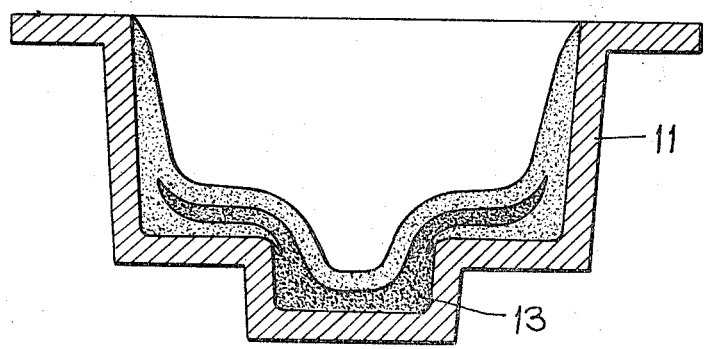
Figure 2C:
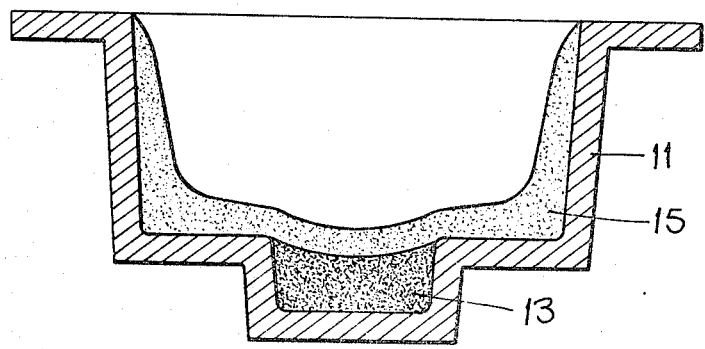

After the at least partial solidification of the button or first-poured chocolate, the mold is then filled with molten chocolate of a different type, e.g., dark chocolate, in accordance with known techniques, and the balance of the process is conducted in known manner. Thus, if filled candies are desired, the completely filled mold is cooled to about 70° F. for a period of time sufficient to solidify the second-poured chocolate at the surface of the mold. During the cooling stage, the mold is inverted to decant the still molten chocolate in the center of the mold, leaving behind solid shell 15 as shown in FIGS. 2B and 2C, depending upon the degree of solidification of the first-poured chocolate. If the second pour is effected before complete solidification of the first-poured chocolate, on inversion some of the still molten first-poured chocolate will run out, thus providing a shell of relatively uniform thickness as shown in FIG. 2B. If, on the other hand, the first-poured chocolate has been allowed to substantially completely solidify, the raised design will be substantially solid, as is shown in FIG. 2C. In either case, however, there is obtained a chocolate shell having an integral raised design of different chocolate from that of the base.

Thereafter, and employing techniques known to those of ordinary skill in the art, the shell is partially filled with the desired filling, for example a fruit-flavored cream, nuts and the like, and finally completely covered with chocolate, normally the same chocolate forming the shell walls, to form a bottom. Finally the mold is cooled to about 50 to 55° F. and the mold is inverted for demolding of the completed candy.

Figure 3A:
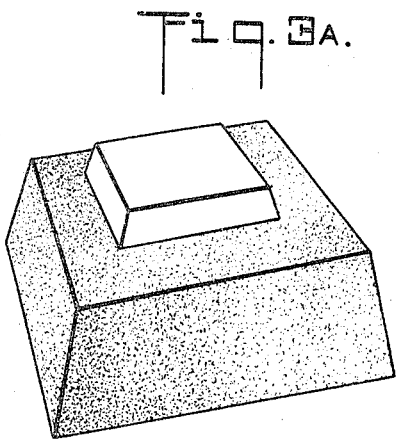
FIGS. 3A and 3B illustrate different embodiments of candies molded in accordance with this invention.

By employing the foregoing procedure there is obtained a candy having a base and an integral top decoration of diffeernt types or colors of chocolate or compounds as shown in FIG. 3A. When filled candies are desired, there can be produced a chocolate shell wherein the top decoration can be completely solid or form a portion of the shell. By virtue of the use of molds to provide the decoration, uniformity of appearance and quality is assured. Moreover, by virtue of the molding process, there is provided a smooth juncture between the raised design and the base of the candy, which could not be obtained with the prior manual techniques. Finally, the method of this invention is readily adaptable for use in conventional automatic or semi-automatic machines, thereby avoiding the labor expense heretofore required to manufacture candies of this type.

Figure 3B:
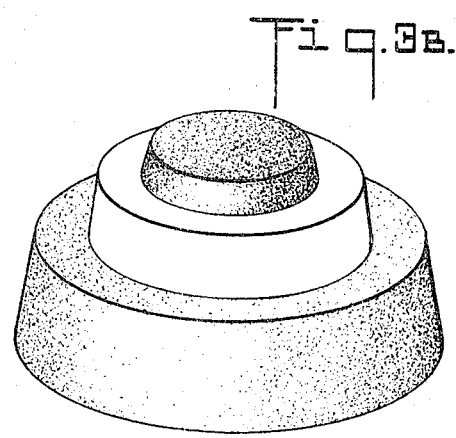

Although the foregoing description has been limited to a candy having a base of one type of chocolate and a raised design of a second type or color, as shown in FIG. 3A, it is obvious that multi-tiered chocolates of any number of layers can be formed in accordance with this invention, such as a three-tiered candy as shown in FIG. 3B, in which each tier is of a differernt form of chocolate. In addition, any type or color of chocolate can be substituted by a compound of any desired type or color. Preferred, however, are those candies wherein at least the base is chocolate. Illustrative of the possible variations are candies having a base of dark chocolate and a decoration of white chocolate, milk chocolate or compound; candies having a base of milk chocolate and a decoration of dark chocolate, white chocolate or compound; and candies having a base of white chocolate and a decoration of dark chocolate, milk chocolate or compound.

What is claimed is:

1. A method for making a molded candy article comprising a shell having walls and a top forming a base and a raised decorative portion of lesser lateral dimension than said base at the juncture thereof, said base and said top portion being integral, formed of different types or colors of chocolate or compound, and having a smooth surface at their juncture, which comprises the steps of:
   (1) pre-heating a mold having a cavity and in the bottom of the cavity a depressed portion corresponding to said raised decorative portion;
   (2) pouring molten chocolate into said depressed portion in an amount at least sufficient to line said depressed portion but not greater than the volume of said depressed portion;
   (3) cooling the chocolate from the exposed surface thereof, whereby at least a film is formed on the exposed surface of the chocolate;
   (4) pouring molten chocolate of a type or color different from that of the first-poured chocolate into said cavity;
   (5) causing solidification of the second-poured chocolate at the surface of the mold, but not the center thereof;
   (6) decanting still-molten chocolate from the center of the mold; and
   (7) separating the solidified molded product from the cavity.

2. A method according to claim 1 wherein said first-poured chocolate is in a partially molten state when the second type or color of chocolate is poured.

3. A method according to claim 1 wherein said first-poured chocolate is completely solidified when the second type or color of chocolate is poured.

4. A method as claimed in claim 2 wherein:
   (1) said mold is preheated to a temperature in the range of from about the melting point of said chocolate to about 15° F. below said melting point;
(2) said chocolate is at a temperature within said range when poured; and
(3) said first-poured chocolate is exposed to ambient air for a period of from about 15 seconds to about 1 minute prior to adding the second-poured chocolate.

References Cited

UNITED STATES PATENTS

| | | | |
|---|---|---|---|
| 787,887 | 4/1905 | Baker | 99—138 |
| 2,425,431 | 8/1947 | Le Vangie | 99—23 |
| 2,461,399 | 6/1948 | Strausser | 99—138 |
| 2,634,210 | 4/1953 | Kimball | 99—11 |
| 2,682,471 | 6/1954 | Alther | 99—138 |

OTHER REFERENCES

Richmond, W.: Choice Confections, Manufacturing Confectioner Publishing Co., Oak Park, Ill., 1954, pp. 346–352.

Trademark Register No. 750,962, registered June 11, 1963.

LIONEL M. SHAPIRO, Primary Examiner

U.S. Cl. X.R.

99—134